United States Patent
Ouderkirk et al.

(10) Patent No.: US 10,642,044 B2
(45) Date of Patent: May 5, 2020

(54) NEAR-EYE DISPLAY SYSTEM HAVING A PELLICLE AS A COMBINER

(71) Applicant: 3M INNOVATIVE PROPERTIES COMPANY, St. Paul, MN (US)

(72) Inventors: Andrew J. Ouderkirk, St. Paul, MN (US); Timothy L. Wong, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 227 days.

(21) Appl. No.: 15/301,563

(22) PCT Filed: Apr. 9, 2015

(86) PCT No.: PCT/US2015/025028
§ 371 (c)(1),
(2) Date: Oct. 3, 2016

(87) PCT Pub. No.: WO2015/157482
PCT Pub. Date: Oct. 15, 2015

(65) Prior Publication Data
US 2017/0176751 A1 Jun. 22, 2017

Related U.S. Application Data

(60) Provisional application No. 61/977,166, filed on Apr. 9, 2014.

(51) Int. Cl.
*G02B 27/01* (2006.01)
*G02C 7/08* (2006.01)

(52) U.S. Cl.
CPC ..... *G02B 27/0172* (2013.01); *G02B 27/0176* (2013.01); *G02C 7/086* (2013.01); *G02B 2027/0178* (2013.01)

(58) Field of Classification Search
None
See application file for complete search history.

(56) References Cited

U.S. PATENT DOCUMENTS

| 3,680,946 | A | 8/1972 | Bellows |
| 4,867,551 | A | 9/1989 | Perera |
| 5,103,337 | A | 4/1992 | Schrenk |
| 5,360,659 | A | 11/1994 | Arends |
| 5,389,324 | A | 2/1995 | Lewis |
| 5,486,949 | A | 1/1996 | Schrenk |

(Continued)

FOREIGN PATENT DOCUMENTS

WO   WO 01/59506   8/2001

OTHER PUBLICATIONS

PCT International Search Report from PCT/US2015/025028, dated Sep. 30, 2015, 5 pages.

*Primary Examiner* — William R Alexander
*Assistant Examiner* — Gary W O'Neill
(74) *Attorney, Agent, or Firm* — Robert S. Moshrefzadeh

(57) ABSTRACT

Near-eye combiner displays are disclosed that utilize dichroic reflectors and/or reflective polarizers disposed as a pellicle positioned within a field of view of the eye. A secondary image can be reflected off of the reflective polarizer and/or dichroic layer towards the eye, and can be superimposed over a primary world-view image being viewed by the eye. The position and orientation of the pellicle can be independently adjusted as desired.

30 Claims, 5 Drawing Sheets

(56) References Cited

U.S. PATENT DOCUMENTS

| | | |
|---|---|---|
| 5,539,578 A | 7/1996 | Togino et al. |
| 5,546,227 A | 8/1996 | Yasugaki |
| 5,654,827 A | 8/1997 | Reichert |
| 5,696,521 A | 12/1997 | Robinson |
| 5,812,100 A | 9/1998 | Kuba |
| 5,882,774 A | 3/1999 | Jonza |
| 6,045,894 A | 4/2000 | Jonza |
| 6,157,490 A | 12/2000 | Wheatley |
| 6,179,948 B1 | 1/2001 | Merrill |
| 6,207,260 B1 | 3/2001 | Wheatley |
| 6,222,677 B1 * | 4/2001 | Budd ................ G02B 27/0172 359/630 |
| 6,353,503 B1 | 3/2002 | Spitzer |
| 6,368,699 B1 | 4/2002 | Gilbert |
| 6,384,982 B1 | 5/2002 | Spitzer |
| 6,486,997 B1 | 11/2002 | Bruzzone |
| 6,531,230 B1 | 3/2003 | Weber |
| 6,783,349 B2 | 8/2004 | Neavin |
| 6,814,896 B2 | 11/2004 | Bhalakia |
| 6,822,770 B1 | 11/2004 | Takeyama |
| 6,926,410 B2 | 8/2005 | Weber |
| 6,939,499 B2 | 9/2005 | Merrill |
| 7,019,905 B2 | 3/2006 | Weber |
| 7,023,602 B2 | 4/2006 | Aastuen |
| 7,077,985 B2 | 7/2006 | Maki |
| 7,106,509 B2 | 9/2006 | Sharp |
| 7,234,816 B2 | 6/2007 | Bruzzone |
| 7,249,846 B2 | 7/2007 | Grand et al. |
| 7,256,936 B2 | 8/2007 | Hebrink |
| 7,316,558 B2 | 1/2008 | Merrill |
| 7,329,006 B2 | 2/2008 | Aastuen |
| 8,556,414 B2 | 10/2013 | Yoshida |
| 8,740,442 B2 | 6/2014 | Weber et al. |
| 9,291,757 B2 | 3/2016 | Merrill et al. |
| 2001/0030715 A1 | 10/2001 | Tabata |
| 2003/0030912 A1 | 2/2003 | Gleckman et al. |
| 2004/0212776 A1 | 10/2004 | Spitzer et al. |
| 2007/0247720 A1 * | 10/2007 | Van Nutt ............... G02B 5/285 359/634 |
| 2007/0273970 A1 | 11/2007 | Hoppe et al. |
| 2010/0157433 A1 | 6/2010 | Mukawa |
| 2010/0214762 A1 | 8/2010 | Nevitt et al. |
| 2011/0026090 A1 | 2/2011 | Minor |
| 2011/0292333 A1 | 12/2011 | Kozaki et al. |
| 2012/0120365 A1 | 5/2012 | Legerton et al. |
| 2012/0162549 A1 | 6/2012 | Gao et al. |
| 2012/0212499 A1 * | 8/2012 | Haddick ............ G02B 27/0093 345/589 |
| 2013/0010360 A1 | 1/2013 | Ouderkirk et al. |
| 2014/0063055 A1 | 3/2014 | Osterhout et al. |
| 2014/0262002 A1 | 9/2014 | Suwa et al. |
| 2015/0077312 A1 * | 3/2015 | Wang .................. G02B 27/017 345/7 |
| 2015/0219896 A1 | 8/2015 | Ouderkirk et al. |
| 2015/0234205 A1 | 8/2015 | Schowengerdt |

\* cited by examiner

NEAR-EYE DISPLAY SYSTEM HAVING A PELLICLE AS A COMBINER

BACKGROUND

There are two main types of near-eye displays: those which only provide a digital image to the eye, and those which combine a real-world view and with a secondary image such as a digital image, known as combiner or combining optics. Examples of digital only near-eye displays include displays used in night-vision monoculars and binoculars, and immersive displays (goggles, helmets) for gaming or simulation which completely block out the world view.

SUMMARY

The present disclosure provides for near-eye combiner displays that utilize dichroic reflectors and/or reflective polarizers disposed as a pellicle positioned within a field of view of the eye, in which a secondary image is reflected off of the reflective polarizer and/or dichroic layer towards the eye. The position and orientation of the pellicle can be independently adjusted as desired. In one aspect, the present disclosure provides a near-eye display system that includes a pellicle capable of being disposed at least partially within a field of view of an eye, the pellicle having a first major surface and an opposing second major surface; and an image forming device positioned to project an image light beam toward the first major surface of the pellicle. The pellicle transmits a first light beam passing through the opposing second major surface toward the eye, and reflects at least a portion of the image light beam toward the eye.

In another aspect, the present disclosure provides a near-eye display system that includes a reflective polarizer capable of being disposed at least partially within a field of view of an eye, the reflective polarizer being aligned to a first polarization direction and having a first major surface and an opposing second major surface; an image forming device positioned to project an image light beam toward the first major surface of the reflective polarizer, the imaged light beam comprising light polarized in the first polarization direction; and an optical element positioned adjacent the reflective polarizer and opposite the image forming device. The optical element further includes a lens; a reflective surface adjacent the opposing second major surface of the reflective polarizer, the reflective surface capable of transmitting a first light beam passing through the lens; and a retarder positioned between the reflective surface and the reflective polarizer. The reflective polarizer, the retarder, and the reflective surface collectively are capable of directing a first portion of the imaged light beam and a second portion of the first light beam toward the eye.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
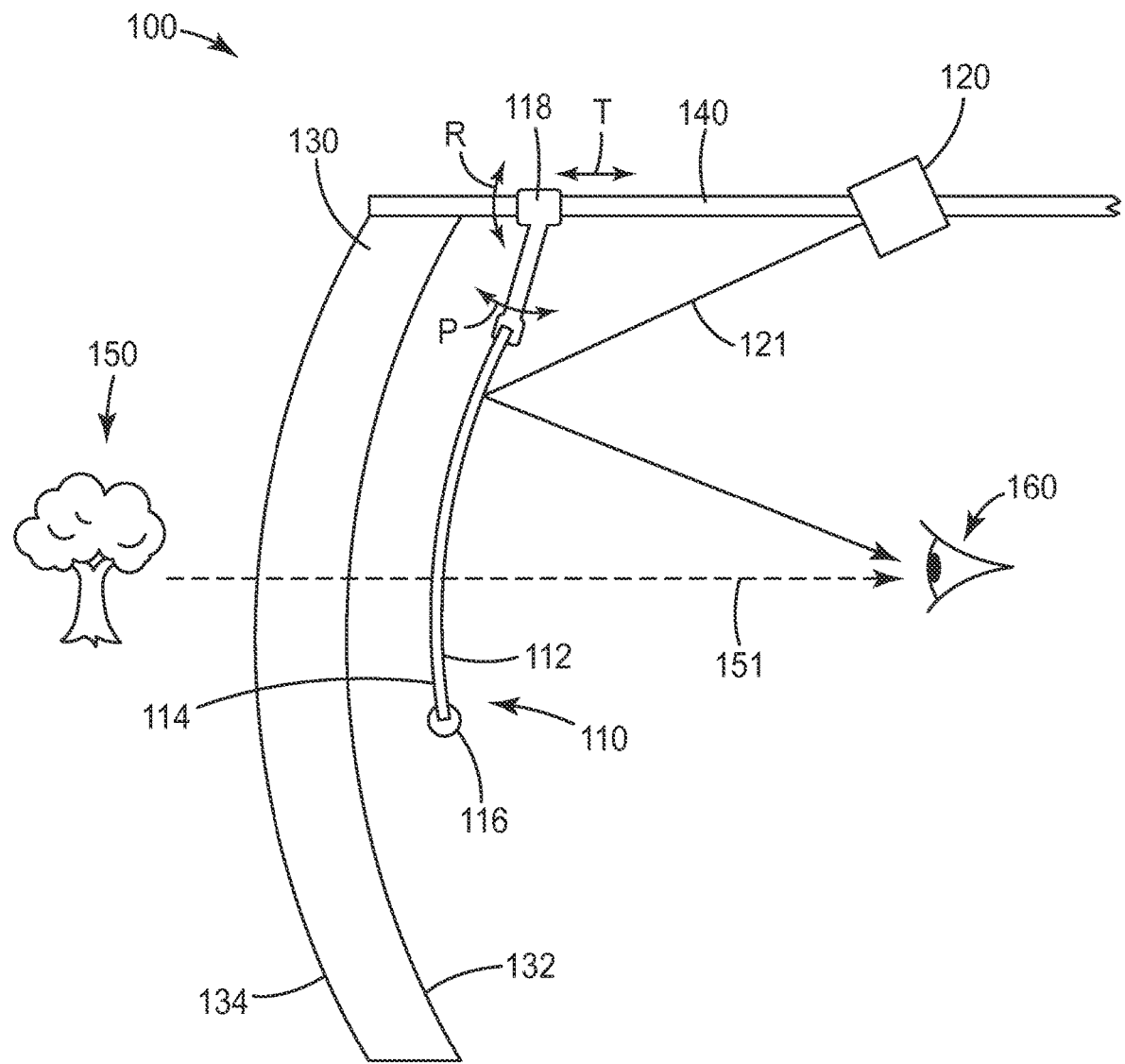
FIG. 1 shows a schematic cross-sectional view of a near-eye display system.

The present disclosure describes near-eye combiner displays that utilize dichroic reflectors and/or reflective polarizers disposed as a pellicle positioned within a field of view of the eye. A secondary image is reflected off of the reflective polarizer and/or dichroic layer towards the eye, and can be superimposed over a primary world-view image being viewed by the eye. The position and orientation of the pellicle can be independently adjusted as desired.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Combining or "combiner" near-eye displays generally rely on the use of optics to both transmit the real world view to the user, and also project a secondary (e.g., digital) image to the eye. One type of combiner display may use a partial mirror, such as a 50% visible light transmission (VLT) mirror, which can transmit part of the world view and also reflect part of the secondary image. Another type of combiner display may use a reflective or weakly reflective polarizer which can nearly fully transmit one polarization state of the world view to the user and also nearly fully (or at least partially) reflect a polarized secondary image to the user. Another type of combiner display may use a dichroic, "notch", or "comb" type reflector which can reflect a band of wavelengths of light (e.g., a first wavelength range of light) to a certain extent but also transmit other bands of wavelengths (e.g., second or more wavelength range of light) or partially transmit the reflection band of wavelengths. Further descriptions of head mounted displays useful with the present invention include, for example, co-pending U.S. Patent Application entitled "Head Mounted Display and Low Conspicuity Pupil Illuminator", filed on Mar. 18, 2014.

A near-eye, heads-up display as provided herein consisting of a pellicle capable of transmitting a view of the real world to the user's eye(s) while also reflecting or transmitting a secondary image, such as one produced via a digital display. In one particular embodiment, the pellicle includes a coating or film that has a dichroic, "notched", or "comb" type transmission and reflection profile. In one particular embodiment, the pellicle includes a reflective polarizer that reflects one polarization state (e.g., a first polarization direction) and passes another polarization state (e.g., a second polarization direction orthogonal to the first polarization direction) to varying degrees. In some cases, the pellicle may also include retarding layer such as a quarter-wave retarder and/or may be use in conjunction with a lens which also has reflecting and/or retarding layers. In some cases, the combined shape of the lens and the pellicle can provide for a magnification of either of the secondary images, the real world view image, or both.

This transmission/reflection profile of the pellicle (whether polarization dependent, wavelength dependent, or independent) enables the user to see, simultaneously, a view of the real world "combined" with the second image based on the wavelengths and/or polarization states of the real world and second image. The pellicle itself or in combination with another refractive element and/or film and/or coating may provide image magnification based on refraction through and/or reflection from curved surfaces.

FIG. 1 shows a schematic cross-sectional view of a near-eye display system 100, according to one aspect of the disclosure. Near-eye display system 100 includes an image forming device 120 that is positioned to project an image light beam having a chief ray 121 directed towards a first major surface 112 of a pellicle 110. In some cases, pellicle 110 can include a reflective polarizer, such as a polymeric reflective polarizer. In some cases, pellicle 110 can include a partial mirror. In some cases, pellicle 110 can include one or more dichroic layers coated or bonded to the first major surface 112, an opposing second major surface 114, or both surfaces of the pellicle 110. In some cases, the pellicle 110 can further include a protective outer rim 116 around its perimeter that can be comprised of a compliant material such as silicone rubber in order to protect the user from possible sharp edges of the pellicle.

The pellicle 110 can be positioned at least partially within a field of view of an eye 160 by a support 118 attached to a frame 140, which may be positioned on the user's head (not shown) similar to a pair of eyeglasses. The support 118 fixes the position and orientation of the pellicle 110 relative to the eye 160 and other components, and may have adjustments corresponding to a pivot "P", rotation "R", and translation "T" between the pellicle 110 and the other optical components including the image forming device 120. In some cases, the pellicle 110 can be rotated out of the field of view of the eye 160. In one particular embodiment, the pellicle 110 can have a curved surface as shown in FIG. 1, to provide for some magnification of the image light beam having the chief ray 121 that is received by the eye 160. In some cases, the near-eye display system can further include an optical element such as a lens 130 that is also affixed to the frame 140, and has a first major lens surface 132, and an opposing second major lens surface 134 that may provide some magnification or other eye-correction of a world view 150.

In the case of a dichroic reflecting layer, the wavelength bands of the chief ray 121 that correspond to the reflection bands of the dichroic layer are partially reflected based on the reflection and transmission profile of the dichroic layer. Likewise, those wavelength bands of the world view 150 transmitted to the eye 160 through the pellicle 110 are attenuated by the dichroic layer. In the case of a reflective polarizer, the polarization states of the chief ray 121 perpendicular to the "fast" axis of the reflective polarizer will be reflected. Likewise the polarization states of the world view 150 will be attenuated by the reflective polarizing layer. After encountering the pellicle 110 the chief ray 121 reflects off of the pellicle 110 and towards the eye 160.

In this manner, the world view 150 can be at least partially transmitted along world view ray 151 and "combined" with the chief ray 121 formed by the image forming device 120. The pellicle 110 may be placed between the eye 160 and another lens 130 with either zero power or a corrective prescription, and with or without other functionalities such as partial transmission, color enhancement, contrast enhancement, photochromism, or polarization filters. In the case of a lens 130 with a polarization filter (such as polarizing sunglasses), the fast axis of the polarization filter should be aligned to the fast axis of the reflective polarizer to maximize transmission of the world view 150 through the pellicle 110.

Figure 2:
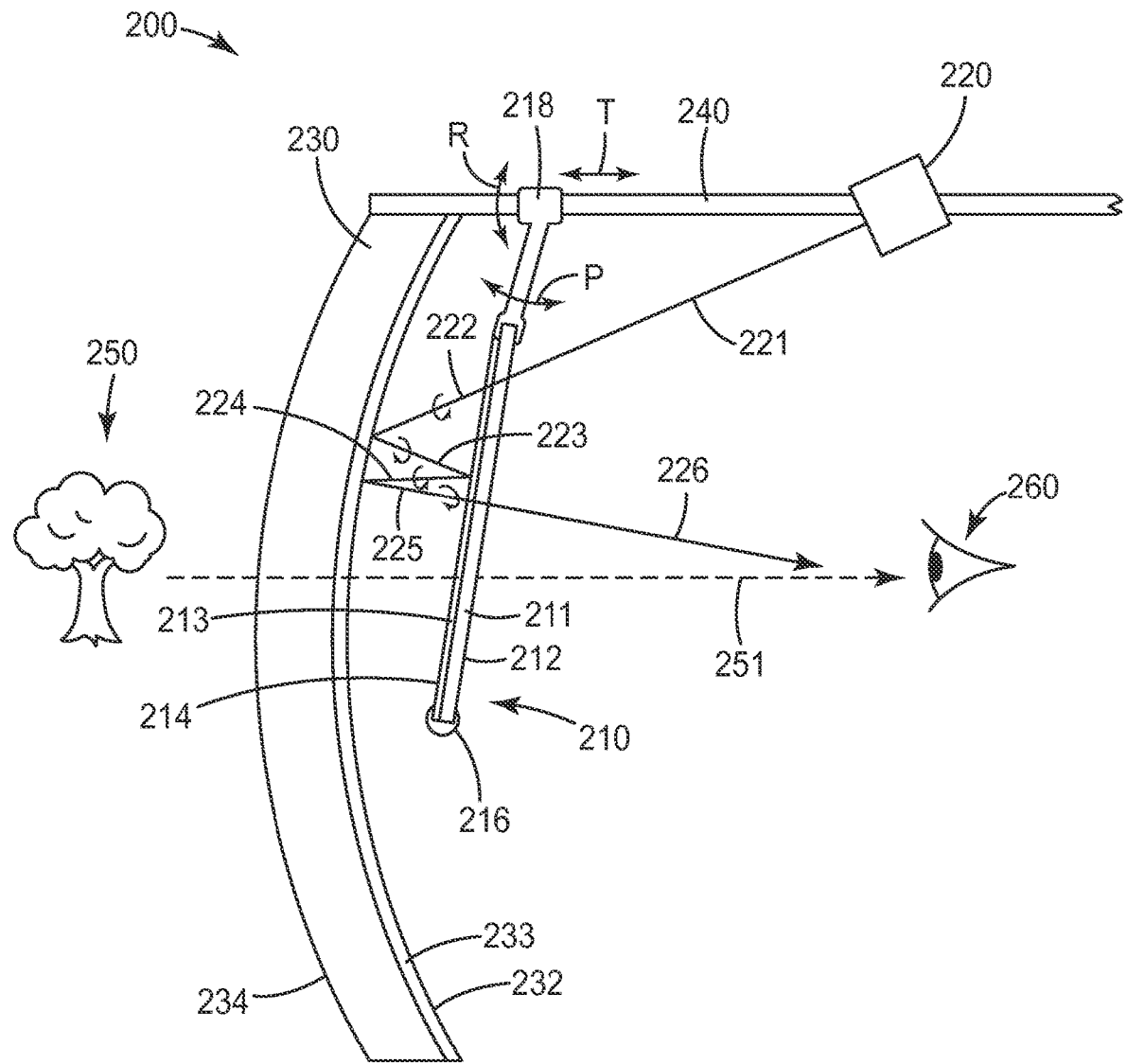
FIG. 2 shows a schematic cross-sectional view of a near-eye display system.

FIG. 2 shows a schematic cross-sectional view of a near-eye display system 200, according to one aspect of the disclosure. Near-eye display system 200 includes an image forming device 220 that is positioned to project an image light beam having a chief ray 221 directed towards a first major surface 212 of a pellicle 210. The pellicle 210 can be positioned at least partially within a field of view of an eye 260 by a support 218 attached to a frame 240, which may be positioned on the user's head (not shown) similar to a pair of eyeglasses. The support 218 fixes the position and orientation of the pellicle 210 relative to the eye 260 and other components, and may have adjustments corresponding to a pivot "P", rotation "R", and translation "T" between the pellicle 210 and the other optical components including the image forming device 220. In some cases, the pellicle 210 can be rotated out of the field of view of the eye 260. In one particular embodiment, the pellicle 210 can have a planar surface as shown in FIG. 2; however, the pellicle 210 can instead have a curved profile as shown in FIG. 1, to provide for some magnification of the image light beam. In some cases, the pellicle 210 can further include a protective outer rim 216 around its perimeter that can be comprised of a compliant material such as silicone rubber in order to protect the user from possible sharp edges of the pellicle.

In some cases, the near-eye display system can further include an optical element such as an ophthalmic or meniscus type lens 230 that is also affixed to the frame 240, and has a first major lens surface 232, and an opposing second major lens surface 234 that may provide some magnification or other eye-correction of a world view 250. A partial reflector 233, such as a dichroic reflecting layer or a partially reflecting layer may be disposed on the surface of, or imbedded within, the lens 230. In the case of a dichroic reflecting layer, the wavelength bands of the chief ray 221 that correspond to the reflection bands of the dichroic layer are partially reflected based on the reflection and transmission profile of the dichroic layer. Likewise, those wavelength bands of the world view 250 transmitted to the eye 260 through the pellicle 210 are attenuated by the dichroic layer. In the case of a partial reflector, a portion of the chief ray 221 will be reflected. Likewise a portion of the world view 150 will be attenuated by partial reflector.

In one particular embodiment, pellicle 210 includes a reflective polarizer 211 aligned to a first polarization direction and adjacent to the first major surface 212 of pellicle 210. Image forming device 220 generates an image having a chief ray 221 directed towards the pellicle 210. The image forming device 220 may emit randomly polarized light or substantially linearly polarized light. In the case of an image consisting of substantially linearly polarized light, the primary polarization state should be aligned to the first polarization direction (i.e., the fast axis) of the reflective polarizer 211, adjacent to the first major surface 212 of the pellicle 210, such that the image is initially transmitted.

The first polarization direction of the image light beam having a chief ray 221 from the image forming device 220 is transmitted through the reflective polarizer 211 of the pellicle 210 and encounters a quarter-wave retarder 213 adjacent the reflective polarizer 211 and an opposing second major surface 214 of the pellicle 210. The quarter-wave retarder 213 converts the chief ray into a first circularly polarized ray 222. The quarter-wave retarder 213 can be adjacent to the reflective polarizer 211, on the opposing second major surface 214 of the pellicle 210 opposite the reflective polarizer 211, ore either on the surface of an ophthalmic or meniscus type lens, or positioned elsewhere in the optical path, as described elsewhere.

The first circularly polarized ray 222 encounters the partial reflector 233, which may be on the surface of (shown) or imbedded within (not shown) the lens 230. In the case of a dichroic reflecting layer the wavelength bands of the image that correspond to the reflection bands of the dichroic layer are reflected. In the case of a partially reflecting layer such as a partial mirror coating the image will reflect to the degree that the mirror coating is reflective. The reflection off of this layer produces a second circularly polarized ray 223 with an opposite phase (handedness) of circular polarization than the first circularly polarized ray 222.

Second circularly polarized ray 223 encounters the quarter-wave retarder 213 and is converted to a substantially linearly polarized ray in which the polarization axis is substantially perpendicular to the fast axis of the reflective polarizer 211. The ray reflects off of the reflective polarizer 211, passes through the quarter-wave retarder 213 and becomes third circularly polarized ray 224. Third circularly polarized ray 224 reflects from the partial reflector 233 and becomes a fourth circularly polarized ray 225 having an opposite phase (handedness), and upon passing through the quarter-wave retarder 213 is converted to a substantially linearly polarized ray having a polarization state substantially aligned to the fast axis of the reflective polarizer 211, and the image ray 226 is transmitted through the pellicle 210 towards the eye 260.

In this manner, the world view 250 can be at least partially transmitted along world view ray 251 and "combined" with the image ray 226 formed by the image forming device 220. The pellicle 210 may be placed between the eye 260 and another lens 230 with either zero power or a corrective prescription, and with or without other functionalities such as partial transmission, color enhancement, contrast enhancement, photochromism, or polarization filters. In the case of a lens 230 with a polarization filter (such as polarizing sunglasses), the fast axis of the polarization filter should be aligned to the fast axis of the reflective polarizer 211 to maximize transmission of the world view 250 through the pellicle 210.

In one particular embodiment, a curvature of the reflective polarizer 211, partial reflector 233, quarter-wave retarder 213, the lens 230, the pellicle 210 or a combination thereof can provide magnification of the original image via refraction through and/or reflection from curved surfaces.

Figure 3:
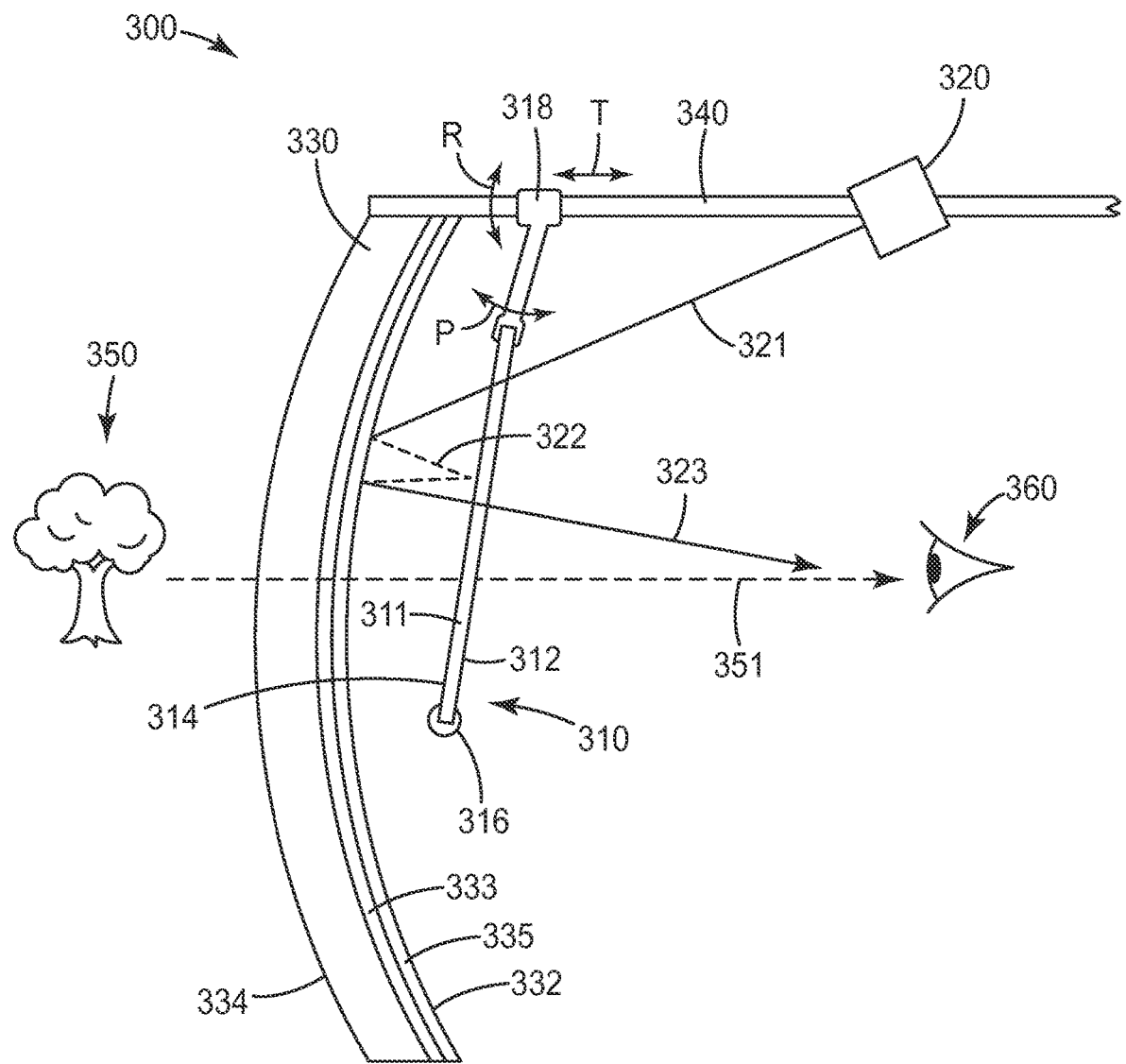
FIG. 3 shows a schematic cross-sectional view of a near-eye display system.

FIG. 3 shows a schematic cross-sectional view of a near-eye display system 300, according to one aspect of the disclosure. Near-eye display system 300 includes an image forming device 320 that is positioned to project an image light beam having a chief ray 321 directed towards a first major surface 312 of a pellicle 310. The pellicle 310 can be positioned at least partially within a field of view of an eye 360 by a support 318 attached to a frame 340, which may be positioned on the user's head (not shown) similar to a pair of eyeglasses. The support 318 fixes the position and orientation of the pellicle 310 relative to the eye 360 and other components, and may have adjustments corresponding to a pivot "P", rotation "R", and translation "T" between the pellicle 310 and the other optical components including the image forming device 320. In some cases, the pellicle 310 can be rotated out of the field of view of the eye 360. In one particular embodiment, the pellicle 310 can have a planar surface as shown in FIG. 3; however, the pellicle 310 can instead have a curved profile as shown in FIG. 1, to provide for some magnification of the image light beam. In some cases, the pellicle 310 can further include a protective outer rim 316 around its perimeter that can be comprised of a compliant material such as silicone rubber in order to protect the user from possible sharp edges of the pellicle.

In some cases, the near-eye display system can further include an optical element such as an ophthalmic or meniscus type lens 330 that is also affixed to the frame 340, and has a first major lens surface 332, and an opposing second major lens surface 334 that may provide some magnification or other eye-correction of a world view 350. A partial reflector 333, such as a dichroic reflecting layer or a partially reflecting layer may be disposed on the surface of, or imbedded within, the lens 330. In the case of a dichroic reflecting layer, the wavelength bands of the chief ray 321 that correspond to the reflection bands of the dichroic layer are partially reflected based on the reflection and transmission profile of the dichroic layer. Likewise, those wavelength bands of the world view 350 transmitted to the eye 360 through the pellicle 310 are attenuated by the dichroic layer. In the case of a partial reflector, a portion of the chief ray 321 will be reflected. Likewise a portion of the world view 150 will be attenuated by partial reflector.

In one particular embodiment, pellicle 310 includes a reflective polarizer 311 aligned to a first polarization direction and adjacent to the first major surface 312 of pellicle 310. Image forming device 320 generates an image having a chief ray 321 directed towards the pellicle 310. The image forming device 320 may emit randomly polarized light or substantially linearly polarized light. In the case of an image consisting of substantially linearly polarized light, the primary polarization state should be aligned to the first polarization direction (i.e., the fast axis) of the reflective polarizer 311, adjacent to the first major surface 312 of the pellicle 310, such that the image is initially transmitted.

The first polarization direction of the image light beam having a chief ray 321 from the image forming device 320 is transmitted through the reflective polarizer 311 of the pellicle 310 and encounters a quarter-wave retarder 335 disposed on the partial reflector 333 adjacent the first major lens surface 332. Each of the quarter-wave retarder 335 and/or the partial reflector 333 may be on the surface of (shown) or imbedded within (not shown) the lens 330. In the case of a dichroic reflecting layer the wavelength bands of the image that correspond to the reflection bands of the dichroic layer are reflected. In the case of a partially reflecting layer such as a partial mirror coating the image will reflect to the degree that the mirror coating is reflective. The reflection off of this layer produces a second circularly polarized ray 323 with an opposite phase (handedness) of circular polarization than the first circularly polarized ray 322.

The quarter-wave retarder 335 converts the chief ray 321 into a circularly polarized ray that reflects from the partial reflector 333, changing the direction of circular polarization, and passes again through the quarter-wave retarder 335 becoming rotated ray 322 having a second polarization direction orthogonal to the first polarization direction. Rotated ray 322 reflects from reflective polarizer 311, and again passes through quarter-wave retarder 335 which converts the rotated ray 321 into a circularly polarized ray that reflects from the partial reflector 333, changing the direction of circular polarization, and passes again through the quarter-wave retarder 335 becoming image ray 323 having the polarization direction, which then passes through reflective polarizer 311 and is directed toward eye 360.

In this manner, the world view 350 can be at least partially transmitted along world view ray 351 and "combined" with the image ray 323 formed by the image forming device 320. The pellicle 310 is be placed between the eye 360 and another lens 330 with either zero power or a corrective prescription, and with or without other functionalities such as partial transmission, color enhancement, contrast enhancement, photochromism, or polarization filters. In the case of a lens 330 with a polarization filter (such as polarizing sunglasses), the fast axis of the polarization filter should be aligned to the fast axis of the reflective polarizer 211 to maximize transmission of the world view 350 through the pellicle 310.

In one particular embodiment, a curvature of the reflective polarizer 311, partial reflector 333, quarter-wave retarder 313, the lens 330, the pellicle 310 or a combination thereof can provide magnification of the original image via refraction through and/or reflection from curved surfaces.

Figure 4:
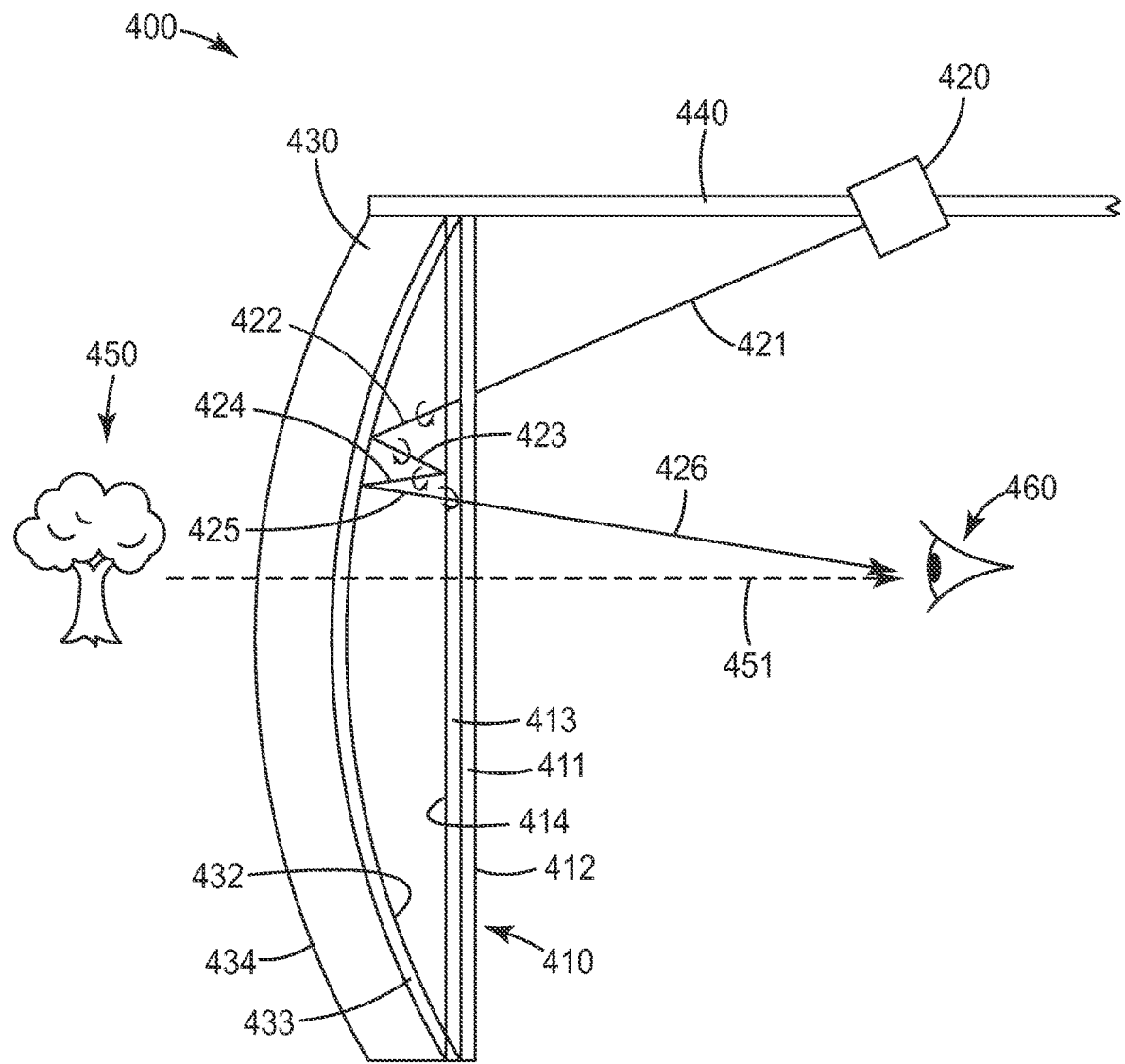
FIG. 4 shows a schematic cross-sectional view of a near-eye display system.

FIG. 4 shows a schematic cross-sectional view of a near-eye display system 400, according to one aspect of the disclosure. Near-eye display system 400 includes an image forming device 420 that is positioned to project an image light beam having a chief ray 421 directed towards a first major surface 412 of a pellicle 410. In some cases, the pellicle 410 can be positioned at least partially within a field of view of an eye 460 and can be releasably attached to a frame 440 which may be positioned on the user's head (not shown) similar to a pair of eyeglasses. In some cases, the pellicle 410 can be releasably attached to an ophthalmic or meniscus type lens 430, in addition to, or instead of, attachment to the frame 440. In one particular embodiment, the pellicle 410 can have a planar surface as shown in FIG. 4; however, the pellicle 410 can instead have a curved profile as shown in FIG. 1, to provide for some magnification of the image light beam. In some cases, the pellicle 410 can further include a protective outer rim (not shown) around its perimeter that can be comprised of a compliant material such as silicone rubber in order to protect the user from possible sharp edges of the pellicle.

In some cases, the near-eye display system further includes an optical element such as the ophthalmic or meniscus type lens 430 that is also affixed to the frame 440, and has a first major lens surface 432, and an opposing second major lens surface 434 that may provide some magnification or other eye-correction of a world view 450. A partial reflector 433, such as a dichroic reflecting layer or a partially reflecting layer may be disposed on the surface of, or imbedded within, the lens 430. In the case of a dichroic reflecting layer, the wavelength bands of the chief ray 421 that correspond to the reflection bands of the dichroic layer are partially reflected based on the reflection and transmission profile of the dichroic layer. Likewise, those wavelength bands of the world view 450 transmitted to the eye 460 through the pellicle 410 are attenuated by the dichroic layer. In the case of a partial reflector, a portion of the chief ray 421 will be reflected. Likewise a portion of the world view 150 will be attenuated by partial reflector.

In one particular embodiment, pellicle 410 includes a reflective polarizer 411 aligned to a first polarization direction and adjacent to the first major surface 412 of pellicle 410. Image forming device 420 generates an image having a chief ray 421 directed towards the pellicle 410. The image forming device 420 may emit randomly polarized light or substantially linearly polarized light. In the case of an image consisting of substantially linearly polarized light, the primary polarization state should be aligned to the first polarization direction (i.e., the fast axis) of the reflective polarizer 411, adjacent to the first major surface 412 of the pellicle 410, such that the image is initially transmitted.

The first polarization direction of the image light beam having a chief ray 421 from the image forming device 420 is transmitted through the reflective polarizer 411 of the pellicle 410 and encounters a quarter-wave retarder 413 adjacent the reflective polarizer 411 and an opposing second major surface 414 of the pellicle 410. The quarter-wave retarder 413 converts the chief ray into a first circularly polarized ray 422. The quarter-wave retarder 413 can be adjacent to the reflective polarizer 411, on the opposing second major surface 414 of the pellicle 410 opposite the reflective polarizer 411, or either on the surface of an ophthalmic or meniscus type lens, or positioned elsewhere in the optical path, as described elsewhere. It is to be understood that the quarter-wave retarder 413 can instead be positioned as shown in FIG. 3, i.e. adjacent the partial reflector 433, in which case the pellicle 410 includes the reflective polarizer 411 without the adjacent quarter-wave retarder 413.

The first circularly polarized ray 422 encounters the partial reflector 433, which may be on the surface of (shown) or imbedded within (not shown) the lens 430. In the case of a dichroic reflecting layer the wavelength bands of the image that correspond to the reflection bands of the dichroic layer are reflected. In the case of a partially reflecting layer such as a partial mirror coating the image will reflect to the degree that the mirror coating is reflective. The reflection off of this layer produces a second circularly polarized ray 423 with an opposite phase (handedness) of circular polarization than the first circularly polarized ray 422.

Second circularly polarized ray 423 encounters the quarter-wave retarder 413 and is converted to a substantially linearly polarized ray in which the polarization axis is substantially perpendicular to the fast axis of the reflective polarizer 411. The ray reflects off of the reflective polarizer 411, passes through the quarter-wave retarder 413 and becomes third circularly polarized ray 424. Third circularly polarized ray 424 reflects from the partial reflector 433 and becomes a fourth circularly polarized ray 425 having an opposite phase (handedness), and upon passing through the quarter-wave retarder 413 is converted to a substantially linearly polarized ray having a polarization state substantially aligned to the fast axis of the reflective polarizer 411, and the image ray 426 is transmitted through the pellicle 410 towards the eye 460.

In this manner, the world view 450 can be at least partially transmitted along world view ray 451 and "combined" with the image ray 426 formed by the image forming device 420. The pellicle 410 may be placed between the eye 460 and another lens 430 with either zero power or a corrective prescription, and with or without other functionalities such as partial transmission, color enhancement, contrast enhancement, photochromism, or polarization filters. In the case of a lens 430 with a polarization filter (such as polarizing sunglasses), the fast axis of the polarization filter should be aligned to the fast axis of the reflective polarizer 411 to maximize transmission of the world view 450 through the pellicle 410.

In one particular embodiment, a curvature of the reflective polarizer 411, partial reflector 433, quarter-wave retarder 413, the lens 430, the pellicle 410 or a combination thereof can provide magnification of the original image via refraction through and/or reflection from curved surfaces.

Figure 5:
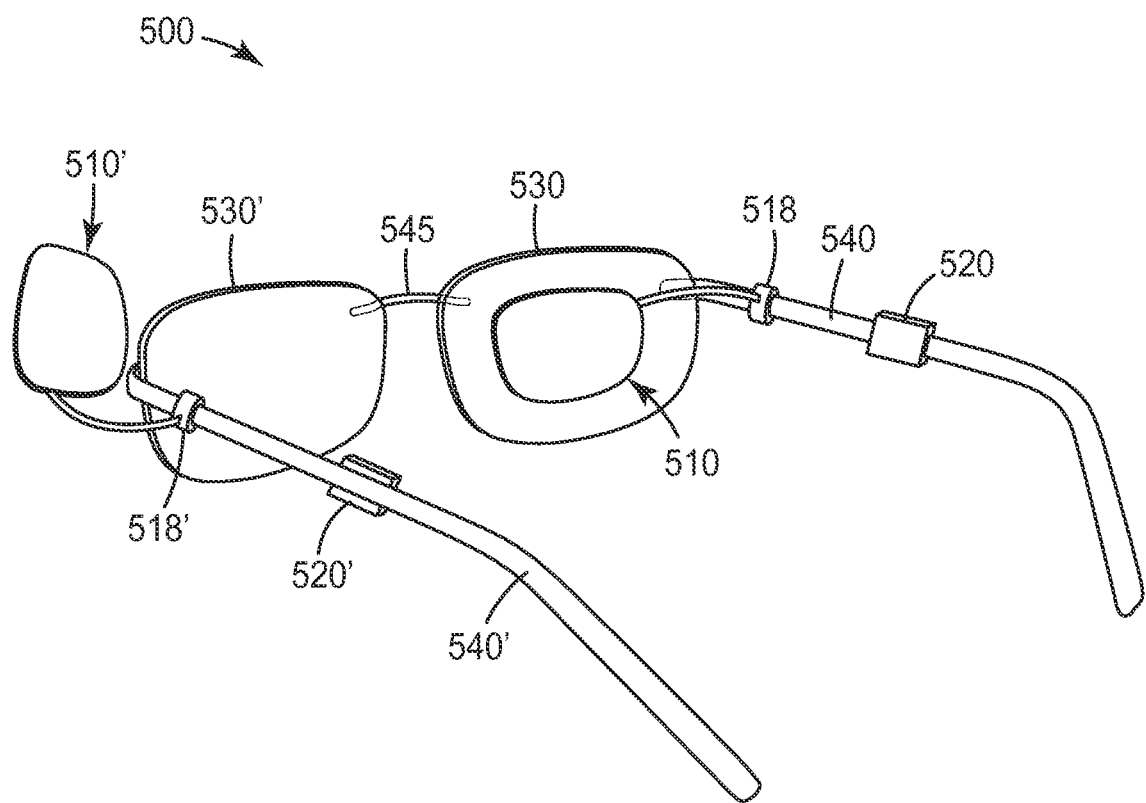
FIG. 5 shows a perspective view of a near-eye display system.

FIG. 5 shows a perspective view of a near-eye display system 500, according to one aspect of the disclosure. Each of the elements 510-540 and 510'-540' shown in FIG. 5 correspond to like-numbered elements 110-140 shown in FIG. 1, which have been described previously. For example, pellicle 510 shown in FIG. 5 corresponds to pellicle 110 shown in FIG. 1, and so on. The respective pellicles, lenses, and other components may be modified and have layers or coatings applied thereon, as described elsewhere.

Near-eye display system 500 includes a first image forming device 520 that is positioned to project an image light toward a first pellicle 510, and an optional second image forming device 520' that is positioned to project a second image light toward an optional second pellicle 510', as described elsewhere. Each of the first and optional second pellicles 510, 510', can be positioned at least partially within a field of view of the user's eyes (not shown) by a first and optional second support 518, 518', attached to a first and a second frame 540, 540', which may be positioned on the user's head (not shown) similar to a pair of eyeglasses. The first and optional second supports 518, 518' fix the position and orientation of the first and optional second pellicles 510, 510', relative to the eyes and other components. The first and optional second supports 518, 518' may include adjustments corresponding to a pivot "P", rotation "R", and translation "T" between the first and optional second pellicles 510, 510', and the other optical components including the first and optional second image forming devices 520, 520', as described elsewhere. In some cases, for example as shown in FIG. 5, a pellicle, such as optional second pellicle 510', can be rotated out of the field of view of the eye. The near-eye display system 500 further includes optical elements such as a first and second lens 530, 530' that are also affixed to the first and second frames 540, 540', and also includes a bridge 545 connecting the first and second lenses 530, 530' together.

It is to be understood that any of the near-eye display systems described herein can be combined with eye monitoring devices, such as those described in co-pending U.S. Patent Application entitled "Head Mounted Display and Low Conspicuity Pupil Illuminator", filed on an even date herewith. The eye monitoring attributes that can be detected may include one or more of the following: the viewing direction of the eye, diameter and changes in the diameter of the pupil, blinking of the eyelids, the eye tracking objects, and saccade movement. Eye tracking parameters may include velocity of the eye rotation and lag or phase between movement of an object and movement of the eye. Saccade movement may include duration, velocity, and pattern of the movement. The pellicles described herein may be useful for providing the reflective surface for the pupil illuminator and image receiving optics, as well as for providing a reflective surface for the near-eye display, as can be readily understood to those having ordinary skill in the art.

Following are a list of embodiments of the present disclosure.

Item 1 is a near-eye display system, comprising: a pellicle capable of being disposed at least partially within a field of view of an eye, the pellicle having a first major surface and an opposing second major surface; and an image forming device positioned to project an image light beam toward the first major surface of the pellicle, wherein the pellicle transmits a first light beam passing through the opposing second major surface toward the eye, and reflects at least a portion of the image light beam toward the eye.

Item 2 is the near-eye display system of item 1, wherein the pellicle comprises a dichroic layer capable of reflecting at least a first wavelength range of light, and transmitting other wavelength ranges of light.

Item 3 is the near-eye display system of item 1 or item 2, wherein the pellicle comprises a dichroic layer capable of reflecting a first wavelength range of light and a second wavelength range of light, and transmitting other wavelength ranges of light.

Item 4 is the near-eye display system of item 1 to item 3, wherein the pellicle comprises a dichroic layer capable of reflecting a first wavelength range of light, a second wavelength range of light, and a third wavelength range of light, and transmitting other wavelength ranges of light.

Item 5 is the near-eye display system of item 1 to item 4, wherein the pellicle comprises a reflective polarizer capable of reflecting a first polarization state of light and transmitting an orthogonal second polarization state of light.

Item 6 is the near-eye display system of item 5, wherein the image light beam comprises the first polarization state of light, and the first light beam comprises the orthogonal second polarization state of light.

Item 7 is the near-eye display system of item 1 to item 6, wherein the pellicle comprises a broadband partial mirror capable of reflecting about half of the image beam.

Item 8 is the near-eye display system of item 1 to item 7, wherein the pellicle comprises a magnifying reflective optic.

Item 9 is the near-eye display system of item 1 to item 8, further comprising an optical element positioned adjacent the second major surface.

Item 10 is the near-eye display system of item 9, wherein the optical element comprises a lens, a partially light transmissive film or coating, a color enhancement film or coating, a contrast enhancement film or coating, a photochromic film or coating, a polarizing film or coating, or a combination thereof.

Item 11 is the near-eye display system of item 1 to item 10, wherein the first light beam is a viewable portion of a world view image.

Item 12 is the near-eye display system of item 1 to item 11, wherein the pellicle comprises an elastomeric protective edge.

Item 13 is the near-eye display system of item 12, wherein the elastomeric protective edge comprises butyl rubber, silicone rubber, polyurethane, and the like.

Item 14 is the near-eye display system of item 1 to item 13, wherein the pellicle is removable and repositionable.

Item 15 is a near-eye display system, comprising: a reflective polarizer capable of being disposed at least partially within a field of view of an eye, the reflective polarizer being aligned to a first polarization direction and having a first major surface and an opposing second major surface; an image forming device positioned to project an image light beam toward the first major surface of the reflective polarizer, the imaged light beam comprising light polarized in the first polarization direction; an optical element positioned adjacent the reflective polarizer and opposite the image forming device, the optical element comprising: a lens; a reflective surface adjacent the opposing second major surface of the reflective polarizer, the reflective surface capable of transmitting a first light beam passing through the lens; and a retarder positioned between the reflective surface and the reflective polarizer, wherein the reflective polarizer, the retarder, and the reflective surface collectively are capable of directing a first portion of the imaged light beam and a second portion of the first light beam toward the eye.

Item 16 is the near-eye display system of item 15, wherein the lens comprises a magnifying lens.

Item 17 is the near-eye display system of item 15 or item 16, wherein the reflective polarizer comprises a pellicle having a planar surface, a curved surface, or combination thereof.

Item 18 is the near-eye display system of item 17, wherein the pellicle comprises an elastomeric protective edge.

Item 19 is the near-eye display system of item 18, wherein the elastomeric protective edge comprises butyl rubber, silicone rubber, polyurethane, and the like.

Item 20 is the near-eye display system of item 17 to item 19, wherein the pellicle is removable and repositionable.

Item 21 is the near-eye display system of item 15 to item 20, wherein the retarder is affixed to the second major surface of the reflective polarizer, affixed to the reflective surface, affixed to both the second major surface of the reflective polarizer and the reflective surface, or displaced from both the reflective polarizer and the reflective surface.

Item 22 is the near-eye display system of item 15 to item 21, wherein the retarder is a quarter-wave retarder having a fast axis aligned about 45 degrees to the first polarization direction.

Item 23 is the near-eye display system of item 15 to item 22, wherein the reflective surface comprises a dichroic reflector or a broadband partial mirror.

Item 24 is the near-eye display system of item 23, wherein the dichroic reflector is capable of reflecting at least a first wavelength range of light, and transmitting other wavelength ranges of light.

Item 25 is the near-eye display system of item 23 or item 24, wherein the dichroic reflector is capable of reflecting a first wavelength range of light and a second wavelength range of light, and transmitting other wavelength ranges of light.

Item 26 is the near-eye display system of item 23 to item 25, wherein the dichroic reflector is capable of reflecting a first wavelength range of light, a second wavelength range of light, and a third wavelength range of light, and transmitting other wavelength ranges of light.

Item 27 is the near-eye display system of item 15 to item 26, wherein the lens further comprises a partially light transmissive film or coating, a color enhancement film or coating, a contrast enhancement film or coating, a photochromic film or coating, a polarizing film or coating, or a combination thereof.

Item 28 is the near-eye display system of item 1 to item 27, further comprising a securing framework proximate the eye.

Item 29 is the near-eye display system of item 1 to item 28, wherein the image forming device comprises an emissive microdisplay.

Item 30 is the near-eye display system of item 29, wherein the emissive microdisplay comprises an OLED display.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A near-eye display system, comprising:
   a pellicle capable of being disposed at least partially within a field of view of an eye, the pellicle having a first exposed major surface and an opposing second exposed major surface; and
   an image forming device positioned to project an image light beam toward the first exposed major surface of the pellicle, the first exposed major surface of the pellicle facing the image forming device, the opposing second exposed major surface of the pellicle facing a world view, wherein the pellicle is configured to transmit a first world view light beam from the world view toward the eye, and reflect at least a portion of the image light beam toward the eye.

2. The near-eye display system of claim 1, wherein the pellicle comprises a dichroic layer capable of reflecting at least a first wavelength range of light, and transmitting other wavelength ranges of light.

3. The near-eye display system of claim 1, wherein the pellicle comprises a dichroic layer capable of reflecting a first wavelength range of light and a second wavelength range of light, and transmitting other wavelength ranges of light.

4. The near-eye display system of claim 1, wherein the pellicle comprises a dichroic layer capable of reflecting a first wavelength range of light, a second wavelength range of light, and a third wavelength range of light, and transmitting other wavelength ranges of light.

5. The near-eye display system of claim 1, wherein the pellicle comprises a reflective polarizer capable of reflecting a first polarization state of light and transmitting an orthogonal second polarization state of light.

6. The near-eye display system of claim 5, wherein the image light beam comprises the first polarization state of light, and the first light beam comprises the orthogonal second polarization state of light.

7. The near-eye display system of claim 1, wherein the pellicle comprises a broadband partial mirror capable of reflecting about half of the image beam.

8. The near-eye display system of claim 1, wherein the pellicle comprises a magnifying reflective optic.

9. The near-eye display system of claim 1, further comprising an optical element positioned adjacent the second exposed major surface.

10. The near-eye display system of claim 9, wherein the optical element comprises a lens, a partially light transmissive film or coating, a color enhancement film or coating, a contrast enhancement film or coating, a photochromic film or coating, a polarizing film or coating, or a combination thereof.

11. The near-eye display system of claim 1, wherein the first light beam is a viewable portion of a world view image.

12. The near-eye display system of claim 1, wherein the pellicle comprises an elastomeric protective edge.

13. The near-eye display system of claim 12, wherein the elastomeric protective edge comprises one or more of butyl rubber, silicone rubber, and polyurethane.

14. The near-eye display system of claim 1, wherein the pellicle is removable and repositionable.

15. A near-eye display system, comprising:
a reflective polarizer configured to face, and being disposed at least partially within a field of view of, an eye, the reflective polarizer being aligned to a first polarization direction and having a first exposed major surface and an opposing second exposed major surface;
an image forming device positioned to project an image light beam toward the first exposed major surface of the reflective polarizer, the image light beam comprising light polarized in the first polarization direction, the first exposed major surface of the reflective polarizer facing the image forming device, the opposing second exposed major surface of the reflective polarizer facing a world view;
an optical element positioned adjacent the reflective polarizer and opposite the image forming device, the optical element comprising:
a lens configured to face the world view;
a reflective surface disposed on, and conforming to, the lens, the reflective surface disposed between the lens and the opposing second exposed major surface of the reflective polarizer, the reflective surface capable of transmitting a first world view light beam from the world view that is incident on, and passes through, the lens; and
a retarder disposed on, and conforming to, the reflective surface, the retarder disposed between the reflective surface and the reflective polarizer,
wherein the reflective polarizer, the retarder, and the reflective surface collectively are capable of directing:
a first portion of the image light beam that is transmitted by the reflective polarizer toward the eye, and
a second portion of the first world view light beam toward the eye.

16. The near-eye display system of claim 15, wherein the lens comprises a magnifying lens.

17. The near-eye display system of claim 15, wherein the reflective polarizer comprises a pellicle having a planar surface, a curved surface, or combination thereof.

18. The near-eye display system of claim 17, wherein the pellicle comprises an elastomeric protective edge.

19. The near-eye display system of claim 18, wherein the elastomeric protective edge comprises one or more of butyl rubber, silicone rubber, and polyurethane.

20. The near-eye display system of claim 17, wherein the pellicle is removable and repositionable.

21. The near-eye display system of claim 15, wherein the retarder is affixed to the second exposed major surface of the reflective polarizer, affixed to the reflective surface, affixed to both the second exposed major surface of the reflective polarizer and the reflective surface, or displaced from both the reflective polarizer and the reflective surface.

22. The near-eye display system of claim 15, wherein the retarder is a quarter-wave retarder having a fast axis aligned about 45 degrees to the first polarization direction.

23. The near-eye display system of claim 15, wherein the reflective surface comprises a dichroic reflector or a broadband partial mirror.

24. The near-eye display system of claim 23, wherein the dichroic reflector is capable of reflecting at least a first wavelength range of light, and transmitting other wavelength ranges of light.

25. The near-eye display system of claim 23, wherein the dichroic reflector is capable of reflecting a first wavelength range of light and a second wavelength range of light, and transmitting other wavelength ranges of light.

26. The near-eye display system of claim 23, wherein the dichroic reflector is capable of reflecting a first wavelength range of light, a second wavelength range of light, and a third wavelength range of light, and transmitting other wavelength ranges of light.

27. The near-eye display system of claim 15, wherein the lens further comprises a partially light transmissive film or coating, a color enhancement film or coating, a contrast enhancement film or coating, a photochromic film or coating, a polarizing film or coating, or a combination thereof.

28. The near-eye display system of claim 1, further comprising a securing framework proximate the eye.

29. The near-eye display system of claim 1, wherein the image forming device comprises an emissive microdisplay.

30. The near-eye display system of claim 29, wherein the emissive microdisplay comprises an OLED display.

\* \* \* \* \*

UNITED STATES PATENT AND TRADEMARK OFFICE
CERTIFICATE OF CORRECTION

PATENT NO. : 10,642,044 B2
APPLICATION NO. : 15/301563
DATED : May 5, 2020
INVENTOR(S) : Ouderkirk et al.

Page 1 of 1

It is certified that error appears in the above-identified patent and that said Letters Patent is hereby corrected as shown below:

In the Specification

Column 3
Lines 35-37, delete "entitled "Head Mounted Display and Low Conspicuity Pupil Illuminator", filed on Mar. 18, 2014." and insert -- having Attorney Docket no. 75083US002 entitled "Low Profile Image Combiner for Near-Eye Displays", filed on Mar. 18, 2014; and also Attorney Docket No. 75976US002 entitled "Head Mounted Display and Low Conspicuity Pupil Illuminator", filed on an even date herewith. --.

Column 10
Line 24, after "Application" insert -- having Attorney Docket No. 74976US002 --.

Signed and Sealed this
Seventh Day of July, 2020

Andrei Iancu
*Director of the United States Patent and Trademark Office*